United States Patent
Gharavi et al.

(10) Patent No.: US 7,205,347 B2
(45) Date of Patent: Apr. 17, 2007

(54) SUBSTITUTED-POLYARYL CHROMOPHORIC COMPOUNDS

(75) Inventors: Alireza Gharavi, Chicago, IL (US); Haythem Saadeh, Burbank, IL (US)

(73) Assignee: Trans Photonics, LLC., Chicago, IL (US)

( * ) Notice: Subject to any disclaimer, the term of this patent is extended or adjusted under 35 U.S.C. 154(b) by 319 days.

(21) Appl. No.: 10/399,271

(22) PCT Filed: Oct. 17, 2001

(86) PCT No.: PCT/US01/32490

§ 371 (c)(1), (2), (4) Date: Apr. 16, 2003

(87) PCT Pub. No.: WO02/33005

PCT Pub. Date: Apr. 25, 2002

(65) Prior Publication Data

US 2004/0013375 A1    Jan. 22, 2004

Related U.S. Application Data

(60) Provisional application No. 60/263,731, filed on Jan. 24, 2001, provisional application No. 60/241,658, filed on Oct. 19, 2000.

(51) Int. Cl.
- C08K 5/23 (2006.01)
- C07C 245/00 (2006.01)
- C09B 62/006 (2006.01)

(52) U.S. Cl. ............ 524/190; 523/200; 534/573; 534/637

(58) Field of Classification Search ........ 534/573, 534/637; 523/200; 524/190
See application file for complete search history.

(56) References Cited

U.S. PATENT DOCUMENTS

| | | |
|---|---|---|
| 4,608,344 A | 8/1986 | Carter et al. |
| 4,624,872 A | 11/1986 | Stuetz |
| 4,647,544 A | 3/1987 | Nicoli et al. |
| 4,671,938 A | 6/1987 | Cook |
| 4,717,508 A | 1/1988 | DeMartino |
| 4,720,355 A | 1/1988 | DeMartino |
| 4,746,186 A | 5/1988 | Nicia |
| 4,752,108 A | 6/1988 | Vollmer |
| 4,757,130 A | 7/1988 | DeMartino |
| 4,766,171 A | 8/1988 | DeMartino |
| 4,767,169 A | 8/1988 | Teng et al. |
| 4,775,637 A | 10/1988 | Sutherland et al. |
| 4,792,670 A | 12/1988 | Fukaya et al. |
| 4,795,664 A | 1/1989 | DeMartino |
| 4,815,843 A | 3/1989 | Tiefenthaler et al. |
| 4,838,634 A | 6/1989 | Bennion et al. |
| 4,851,502 A | 7/1989 | DeMartino |
| 4,855,376 A | 8/1989 | De Martino et al. |
| 4,857,273 A | 8/1989 | Stewart |
| 4,880,752 A | 11/1989 | Keck et al. |
| 4,887,884 A | 12/1989 | Hayden |
| 4,898,691 A | 2/1990 | Borzo et al. |
| 4,917,455 A | 4/1990 | Soane |
| 4,932,738 A | 6/1990 | Haas et al. |
| 4,936,644 A | 6/1990 | Raskin et al. |
| 4,936,645 A | 6/1990 | Yoon et al. |
| 4,950,074 A | 8/1990 | Fabricius et al. |
| 4,978,476 A | 12/1990 | Allen et al. |
| 5,002,361 A | 3/1991 | DeMartino et al. |
| 5,006,285 A | 4/1991 | Thackara et al. |
| 5,007,696 A | 4/1991 | Thackara et al. |
| 5,039,186 A | 8/1991 | Man et al. |
| 5,044,725 A | 9/1991 | DeMartino et al. |
| 5,061,048 A | 10/1991 | Hayden et al. |
| 5,076,658 A | 12/1991 | Hayden et al. |
| 5,081,012 A | 1/1992 | Flanagan et al. |
| 5,082,629 A | 1/1992 | Burgess, Jr. et al. |
| 5,093,833 A | 3/1992 | Pang et al. |
| 5,100,589 A | 3/1992 | Ticknor |
| 5,106,211 A | 4/1992 | Chiang et al. |
| 5,135,876 A | 8/1992 | Andrade et al. |
| 5,156,810 A | 10/1992 | Ribi |
| 5,192,507 A | 3/1993 | Taylor et al. |
| 5,196,509 A | 3/1993 | Allen |
| 5,200,552 A | 4/1993 | Urano et al. |
| 5,202,231 A | 4/1993 | Drmanac et al. |
| 5,212,269 A | 5/1993 | Fischer et al. |
| 5,216,173 A | 6/1993 | Stephens et al. |
| 5,264,507 A | 11/1993 | Wiesenfeldt et al. |
| 5,274,061 A | 12/1993 | Urano et al. |
| 5,286,803 A | 2/1994 | Lindsay et al. |
| 5,298,588 A | 3/1994 | Gibbons et al. |
| 5,317,428 A | 5/1994 | Osawa et al. |

(Continued)

FOREIGN PATENT DOCUMENTS

DE    4333291    4/1995

(Continued)

OTHER PUBLICATIONS

International Search Report for corresponding PCT/US01/32490 (WO 02/033005) published Sep. 25, 2003.

(Continued)

*Primary Examiner*—Tae H Yoon
(74) *Attorney, Agent, or Firm*—Marshall, Gerstein & Borun LLP

(57) ABSTRACT

The invention provides for novel substituted-polyaryl chromophoric compounds which desirably comprise a single diazo group, and optimally include a plurality of diazo groups. Preferably the chromophores exhibit optical nonlinear second-order properties and have unique absorption maximum and other chromophoric properties that make them useful for, among other things, multifunctional optical switches or waveguides.

3 Claims, No Drawings

U.S. PATENT DOCUMENTS

| | | | |
|---|---|---|---|
| 5,318,729 A | 6/1994 | Kurihara et al. | |
| 5,319,492 A | 6/1994 | Dorn et al. | |
| 5,322,986 A | 6/1994 | Nutt | |
| 5,340,715 A | 8/1994 | Slovacel et al. | |
| 5,390,157 A | 2/1995 | Revelli, Jr. | |
| 5,393,645 A | 2/1995 | Etzbach et al. | |
| 5,434,231 A | 7/1995 | Wiesenfeldt et al. | |
| 5,450,511 A | 9/1995 | Dragone | |
| 5,459,232 A | 10/1995 | Sotoyama et al. | |
| 5,461,131 A | 10/1995 | Wiesenfeldt et al. | |
| 5,465,151 A | 11/1995 | Wybourne et al. | |
| 5,465,310 A | 11/1995 | Kersten et al. | |
| 5,471,548 A | 11/1995 | Brazas | |
| 5,484,821 A | 1/1996 | Mandal et al. | |
| 5,496,700 A | 3/1996 | Ligler et al. | |
| 5,496,701 A | 3/1996 | Pollard-Knight | |
| 5,496,899 A | 3/1996 | Foll et al. | |
| 5,534,201 A | 7/1996 | Summers et al. | |
| 5,544,268 A | 8/1996 | Bischel et al. | |
| 5,555,326 A | 9/1996 | Hwang et al. | |
| RE35,407 E | 12/1996 | Wiesenfeldt et al. | |
| 5,581,642 A | 12/1996 | Deacon et al. | |
| 5,594,075 A | 1/1997 | Reinhardt et al. | |
| 5,594,093 A | 1/1997 | Sotoyama et al. | |
| 5,606,170 A | 2/1997 | Saaski et al. | |
| 5,612,449 A | 3/1997 | Sotoyama et al. | |
| 5,631,170 A | 5/1997 | Attridge | |
| 5,657,406 A | 8/1997 | Ball | |
| 5,659,010 A | 8/1997 | Sotoyama et al. | |
| 5,663,308 A | 9/1997 | Gibbons et al. | |
| 5,663,790 A | 9/1997 | Ekstrom et al. | |
| 5,682,255 A | 10/1997 | Friesem et al. | |
| 5,688,906 A | 11/1997 | Jen et al. | |
| 5,712,705 A | 1/1998 | Fattinger et al. | |
| 5,714,304 A | 2/1998 | Gibbons et al. | |
| 5,726,785 A | 3/1998 | Chawki et al. | |
| 5,729,641 A | 3/1998 | Chandonnet et al. | |
| 5,736,592 A | 4/1998 | DeMeuse et al. | |
| 5,738,806 A | 4/1998 | Beckmann et al. | |
| 5,740,287 A | 4/1998 | Scalora et al. | |
| 5,744,276 A | 4/1998 | Ohno et al. | |
| 5,745,612 A | 4/1998 | Wang et al. | |
| 5,745,629 A | 4/1998 | Sasaki | |
| 5,748,349 A | 5/1998 | Mizrahi | |
| 5,748,350 A | 5/1998 | Pan et al. | |
| 5,748,811 A | 5/1998 | Amersfoort et al. | |
| 5,748,815 A | 5/1998 | Hamel et al. | |
| 5,750,337 A | 5/1998 | Squirrell | |
| 5,757,989 A | 5/1998 | Yoshimura et al. | |
| 5,776,374 A | 7/1998 | Newsham et al. | |
| 5,777,089 A | 7/1998 | Beckmann et al. | |
| 5,781,677 A | 7/1998 | Jin et al. | |
| 5,783,649 A | 7/1998 | Beckmann et al. | |
| 5,818,983 A | 10/1998 | Yoshimura et al. | |
| 5,835,646 A | 11/1998 | Yoshimura et al. | |
| 5,837,804 A | 11/1998 | Yamagishi et al. | |
| 5,846,814 A | 12/1998 | Galla et al. | |
| 5,854,866 A | 12/1998 | Leonard | |
| 5,917,980 A | 6/1999 | Yoshimura et al. | |
| 5,952,448 A | 9/1999 | Lee et al. | |
| 6,194,120 B1 | 2/2001 | Chan et al. | |
| 6,429,023 B1 | 8/2002 | Gharavi | |
| 6,661,942 B1 | 12/2003 | Gharavi | |
| 6,894,174 B1 | 5/2005 | Gharavi et al. | |
| 2002/0009274 A1 | 1/2002 | Gharavi | |

FOREIGN PATENT DOCUMENTS

| | | |
|---|---|---|
| EP | 0 205 236 | 12/1986 |
| EP | 0 218 938 | 4/1987 |
| EP | 0 231 770 | 8/1987 |
| EP | 0 238 789 | 9/1987 |
| EP | 0 280 434 | 8/1988 |
| EP | 0 290 061 | 11/1988 |
| EP | 0 297 530 | 1/1989 |
| EP | 0 337 405 | 10/1989 |
| EP | 0 351 832 | 1/1990 |
| EP | 0 372 433 | 6/1990 |
| EP | 0 380 139 | 8/1990 |
| EP | 0 394 027 | 10/1990 |
| EP | 0 396 172 | 11/1990 |
| EP | 0 406 888 | 1/1991 |
| EP | 0 413 903 | 2/1991 |
| EP | 0 435 456 | 7/1991 |
| EP | 0 436 115 | 7/1991 |
| EP | 0 464 795 | 1/1992 |
| EP | 0 478 268 | 4/1992 |
| EP | 0 488 708 | 6/1992 |
| EP | 0 499 272 | 8/1992 |
| EP | 0 554 904 | 8/1993 |
| EP | 0 559 356 | 9/1993 |
| EP | 0 565 031 | 10/1993 |
| EP | 0 583 042 | 2/1994 |
| EP | 0 583 417 | 2/1994 |
| EP | 0 587 228 | 3/1994 |
| EP | 0 583 081 | 4/1994 |
| EP | 0 617 314 | 9/1994 |
| EP | 0 648 792 | 4/1995 |
| EP | 0 689 067 | 12/1995 |
| EP | 0 727 692 | 8/1996 |
| EP | 0 733 920 | 9/1996 |
| EP | 0 766 123 | 4/1997 |
| EP | 0 778 479 | 6/1997 |
| JP | 5127203 | 5/1993 |
| JP | 5140065 | 6/1993 |
| JP | 5230385 | 9/1993 |
| JP | 6067230 | 3/1994 |
| JP | 7276828 | 10/1995 |
| JP | 8179389 | 7/1996 |
| JP | 9052951 | 2/1997 |
| WO | WO-98/40783 | 9/1998 |
| WO | WO-01/06240 | 1/2001 |
| WO | WO-01/06305 | 1/2001 |
| WO | WO 0158856 | 8/2001 |
| WO | WO-02/33005 | 4/2002 |

OTHER PUBLICATIONS

Shi et al., "Low(Sub-1-volt) halfwave voltage polymeric electrooptic modulators achieved by controlling chromophores shape," *Science 288*, 199-122 (Apr. 2000).

Marder et al., "Design and synthesis of chromophores and polymers for electro-optic and photorefractive applications," *Nature 388* 845-851 (1997).

Saadeh et al., "Polyamides with a Diazo Chromophore Exhibiting High Thermal Stability and Large Electrooptic Coefficients," *Macromolecules 30*(18) 5403-5407 (1997).

Yu et al., "Novel Second Order Nonlinear Optical, Aromatic and Aliphatic Polyimides Exhibiting Hight Temperature Stability," *Applied Physics Letters 66*, 1050-1052 (1995).

Yu et al., "Novel Second Order Nonlinear Optical Polyimides," *Society of Photooptical Instrumentation Engineers 2527*, 127-136.

Moylan et al., "Nonlinear Optical Chromophores with large Hyperpolarizabilities and Enhanced Thermal Stabilities," *J. Am. Chem. Soc. 115*, 12599-12600 (1993).

Moylan et al., "Characterization of Nonlinear Optical Chromophores in Solution," from Polymers for Second-Order Nonlinear Optics, ACS Symposium Series 601: 66-81 (1995).

Sotoyama, et al., "Directional-Coupled Optical Switch Between Stacked Waveguide Layers Using Electro-Optic Polymer," *Japanese Journal of Applied Physics 3* (8B), L1180-L1181 (1992).

Yu et al., "Design and Synthesis of Functionalized Polyimerides for Second-Order Nonlinear Optics," *Macromolecules 27*(23), 6718-6721 (1994).

Yu et al., "A Generic Approach to Functionalizing Aromatic Polyimides for Second-Order Nonlinear Optics," *Macromolecules* 28(3), 784-786 (1995).

EP 0 604 841 published Jul. 6, 1994 and attached English Language Abstract (NERAC Abstract WNDABSM).

Bower et al., "Aromatic polyimides," *J. Poly. Sci. A. 1*(10), 3135-3150 (1963).

Carlin et al., "The Benzidine Rearrangement- VII. The Rearrangements of 3,3'-Dibromo-5,5'-dimethylhydrazobenzene in 2:1 Sulfuric Acid," *J.Amer. Chem. Soc.* 78(9), 1992-1997 (1956).

Kolb et al., "A Convenient preparation of iodoalkyl esters from lactones" *J. Syn. Commun.* 11, 763-67 (1981).

Li et al., "Preparation and absorption spectrum studies of aromatic and alicyclic poly(amide acid) ammonium salts in water and DNF and in films," *J.Poly Sci. A: Polym. Chem.* 36(8), 1329-40 (1998).

McMurry et al., "An Improved Method for the Cleavage of Methyl Esters," *Syn. Commn.* 2, 389-394 (1972).

Yu et al., "Novel Aromatic Polyimides for Nonlinear Optics," *J. Am Chem Soc.* 117, 11680-86 (1995).

Yu et al., "Highly Stable Copolyimides for Second-Order Nonlinear Optics," *Macromolecules* 29, 6139-6142 (1996).

CRISP Abstract, Grant No. 1R43ES009477-01 Alireza Gharavi, "Biosensors with Polymeric Optical Waveguides," Fiscal Year 1998 (published at http://crips.cit.nih.gov/crisp/ . . . ).

STTR Abstract, STTR Phase I Grant to Alireza Gharavi, "A Multi-Functional Optical Switch: a WDM Add/Drop Muiltiplexer and Cross-Connect Device," Fiscal Year 1998 (published at http://www.winbbbbbbbmdo.com/scripts/sbir/ . . . ).

SBIR Abstract, SBIR Phase I Grant to Alireza Gharavi, "Mid-Infrared Stacked Waveguide Laser Arrays with Organic Light Emitting Diodes," Fiscal Year 2000 (published at http://222.winbmdo.com/scripts/sbir/ . . . ).

Ep 0 514 857 published May 20, 1992 (including English language claims) and attached English language abstract.

Hikita et al., "Optical Intensity Modulation in a Vertically stacked Coupler Incorporating Electro-Optic Polymer," *Applied Physics Letters* 63, 1161-1163 (1993).

Barrett et al., "Photoinscription of Channel Waveguides and Grating Couplers in Azobenzene Polymer Thin Films," *SPIE* 3006:441-449.

Dialog Database Abstract for JP 6214275 (Accession No. 10020459).

Dialog Database Abstract for JP 8262246 (Accession No. 11012351).

Dialog Database Abstract for JP 9022035 (Accession No. 11164080).

Dialog Database Abstract for JP 9090153 (Accession No. 11285129).

Dialog Database Abstract for JP 9318982 (Accession No. 11674374).

Rochon et al., "Optically Induced and Erased Birefringence and Dichroism in Azoaromatic Polymers," *Appl. Phys. Lett.* 60:4-5 (1992).

Kim et al., "Laser Induced Holographic Surface Relief Gratings on Nonlinear Optical Polymer Films," *Appl. Phys. Lett.* 66: 1166-1168 (1995).

Girton et al., Electrooptic Polymer Mach-Zehnder Modulator, ACS Symposium Series 601- Polymers for Second-Order Nonlinear Optics: 456-486, Washington, D.C. (1995).

Keil, "Realization of IO-Polymer-Components and Present State in Polymer Technology," in *Integrated Optics and Micro-Optics with Polymers*, p. 273, Stuttgart-Leipzig, BG Teubner Verlagsgesellschaft (1993).

Miller et al., "Substituted Azole Derivatives as Nonlinear Optical Chromophores," *Chem. Mater.* 6, 1023-1032 (1994).

Lee et al., "Reversible Optical Control of Transmittance in Polymer/Liquid Crystal Composite Films by Photoinduced Phase Transition," *Journal of Applied Physics* 86(11):5927-5934, American Institute of Physics, New York, US (1999).

Wu et al., "Photoinduced Alignment of polymer liquid crystals containing azobenzene moieties in the side chain.4. Dynamic study of the alignment process," *Polymer* 40(17): 4787-4793, Elsevier Science BV, GB, (1999).

Bauer et al., "Konkave Farbstoffe mit Azobenzol-Einheiten als Chromophore, Photoschaltelemente und hohlraumbildende Bausteine," *Chemische Berichter—Inorganic and Organometallic Chemistry—A European Journal* 125:1675-1686, VCH Verlagsgesellschaft MBG, Weinheim, GE (1992).

Shuto et al., "Electrooptic Light Modulation and Second-Harmonic Generation in Novel Diazo-Dye-Substituted Poled Polymers," *IEEE Photonics Technology Letters* 3(11):1003-1006, IEEE Inc., New York, US, (1991).

Hattori et al., "Fabrication of Refractive Index Grating Into Azo-Dye-Containing Polymer Films by Irreversible Photoinduced Bleaching," *Journal of Applied Physics* 87(7):3240-3244, American Institute of Physics, New York, US (2000).

Japanese Patent Abstract No.: JP 5127203 A, Derwent World Patents Index, Dialog File No. 351, Accession No. 9507718, 1 page.

Japanese Patent Abstract No. JP 5140065 A, Derwent World Patents Index, Dialog File No. 351, Accession No. 9523194, 2 pages.

Japanese Patent Abstract No. JP 5230385 A, Derwent World Patents Index, Dialog File No. 351, Accession No. 9624155, 2 pages.

Japanese Patent Abstract No. JP 6067230 A, Derwent World Patents Index, Dialog File No. 351, Accession No. 9841586.

Japanese Patent Abstract No. JP 8179389 A, Derwent World Patents Index, Dialog File No. 351, Accession No. 10878400.

Japanese Patent Abstract No. JP 7276828 A, Derwent World Patents Index, Dialog File No. 351, Accession No. 10499076.

Database Crossfile Beilstein [Online], Beilstein Institut Z. Foerd. Der Chem., Wissensch, Frankfurt am Main, DE, Database Accessionnumber 641236 (BRN), Nov. 18, 1988. 1 page.

Database Crossfile Beilstein [Online], Beilstein Institut Z. Foerd. Der Chem., Wissensch, Frankfurt am Main, DE, Database Accessionnumber 6700368 (BRN), Jul. 15, 1994, 1 page.

Database Crossfile Beilstein [Online], Beilstein Institut Z. Foerd. Der Chem., Wissensch, Frankfurt am Main, DE, Database Accessionnumber 744000 (BRN), Nov. 28, 1988, 1 page.

Database Crossfile Beilstein [Online], Beilstein Institut Z. Foerd. Der Chem., Wissensch, Frankfurt am Main, DE, Database Accessionnumber 744001(BRN), Nov. 28, 1988, 1 page.

Database Crossfile Beilstein [Online], Beilstein Institut Z. Foerd. Der Chem., Wissensch, Frankfurt am Main, DE, Database Accessionnumber 957570 (BRN), Nov. 28, 1988, 1 page.

Database Crossfile Beilstein [Online], Beilstein Institut Z. Foerd. Der Chem., Wissensch, Frankfurt am Main, DE, Database Accessionnumber 91554 (BRN), Nov. 28, 1998, 1 page.

Database Crossfile Beilstein [Online], Beilstein Institut Z. Foerd. Der Chem., Wissensch, Frankfurt am Main, DE, Database Accessionnumber 3413412 (BRN), Jun. 2, 1992, 1 page.

Database Crossfile Beilstein [Online], Beilstein Institut Z. Foerd. Der Chem., Wissensch, Frankfurt am Main, DE, Database Accessionnumber 3534429 (BRN), Feb. 15, 1990, 1 page.

Database Crossfile Beilstein [Online], Beilstein Institut Z. Foerd. Der Chem., Wissensch, Frankfurt am Main, DE, Database Accessionnumber 352605 (BRN), Jun. 2, 1992, 1 page.

Database Crossfile Beilstein [Online], Beilstein Institut Z. Foerd. Der Chem., Wissensch, Frankfurt am Main, DE, Database Accessionnumber 1829399 (BRN), Jun. 29, 1989, 1 page.

Database Crossfile Beilstein [Online], Beilstein Institut Z. Foerd. Der Chem., Wissensch, Frankfurt am Main, DE, Database Accessionnumber 1832822 (BRN), Jun. 29, 1989, 1 page.

Database Crossfile Beilstein [Online], Beilstein Institut Z. Foerd. Der Chem., Wissensch, Frankfurt am Main, DE, Database Accessionnumber 1897660 (BRN), Jun. 29, 1989, 1 page.

Database Crossfile Beilstein [Online], Beilstein Institut Z. Foerd. Der Chem., Wissensch, Frankfurt am Main, DE, Database Accessionnumber 1897874 (BRN), Jun. 29, 1989.

Database Crossfile Beilstein [Online], Beilstein Institut Z. Foerd. Der Chem., Wissensch, Frankfurt am Main, DE, Database Accessionnumber 1989341 (BRN), Jun. 29, 1989, 1 page.

Database Crossfile Beilstein [Online], Beilstein Institut Z. Foerd. Der Chem., Wissensch, Frankfurt am Main, DE, Database Accessionnumber 1917359 (BRN), Jun. 29, 1989, 1 page.

Database Crossfile Beilstein [Online], Beilstein Institut Z. Foerd. Der Chem., Wissensch, Frankfurt am Main, DE, Database Accessionnumber 3180444 (BRN), Feb. 15, 1990, 1 page.

Database Crossfile Beilstein [Online], Beilstein Institut Z. Foerd. Der Chem., Wissensch, Frankfurt am Main, DE, Database Accessionnumber 6983599 (BRN), Jan. 25, 1995, 1 page.

Database Crossfile Beilstein [Online], Beilstein Institut Z. Foerd. Der Chem., Wissensch, Frankfurt am Main, DE, Database Accessionnumber 6986297 (BRN), Jan. 25, 1995, 1 page.

Database Crossfile Beilstein [Online], Beilstein Institut Z. Foerd. Der Chem., Wissensch, Frankfurt am Main, DE, Database Accessionnumber 6981096 (BRN), Jan. 25, 1995, 1 page.

Database Crossfile Beilstein [Online], Beilstein Institut Z. Foerd. Der Chem., Wissensch, Frankfurt am Main, DE, Database Accessionnumber 3451145 (BRN), Feb. 15, 1990, 1 page.

Database Crossfile Beilstein [Online], Beilstein Institut Z. Foerd. Der Chem., Wissensch, Frankfurt am Main, DE, Database Accessionnumber 3451472 (BRN), Feb. 15, 1990, 1 page.

Database Crossfile Beilstein [Online], Beilstein Institut Z. Foerd. Der Chem., Wissensch, Frankfurt am Main, DE, Database Accessionnumber 1828573 (BRN), Jun. 29, 1989, 1 page.

Database Crossfile Beilstein [Online], Beilstein Institut Z. Foerd. Der Chem., Wissensch, Frankfurt am Main, DE, Database Accessionnumber 8522605 (BRN), Jul. 18, 2000, 1 page.

Database Crossfile Beilstein [Online], Beilstein Institut Z. Foerd. Der Chem., Wissensch, Frankfurt am Main, DE, Database Accessionnumber 8527886 (BRN), Jul. 18, 2000, 1 page.

Database Crossfile Beilstein [Online], Beilstein Institut Z. Foerd. Der Chem., Wissensch, Frankfurt am Main, DE, Database Accessionnumber 8530981 (BRN), Jul. 18, 2000, 1 page.

Database Crossfile Beilstein [Online], Beilstein Institut Z. Foerd. Der Chem., Wissensch, Frankfurt am Main, DE, Database Accessionnumber, 923706 (BRN), Nov. 28, 1988, 1 page.

Database Crossfile Beilstein [Online], Beilstein Institut Z. Foerd. Der Chem., Wissensch, Frankfurt am Main, DE, Database Accessionnumber 925977 (BRN), Nov. 28, 1988, 1 page.

Database Crossfile Beilstein [Online], Beilstein Institut Z. Foerd. Der Chem., Wissensch, Frankfurt am Main, DE, Database Accessionnumber 3180444 (BRN), Feb. 15, 1990, 1 page.

Database Crossfile Beilstein [Online], Beilstein Institut Z. Foerd. Der Chem., Wissensch, Frankfurt am Main, DE, Database Accessionnumber 3527855 (BRN), Feb. 15, 1990, 1 page.

SUBSTITUTED-POLYARYL CHROMOPHORIC COMPOUNDS

CROSS-REFERENCE TO RELATED APPLICATIONS

This application is the U.S. National Stage of International Application No. PCT/US01/32490, filed Oct. 17, 2001, and was published in English as PCT WO 02/33005 under PCT Article 21(2). This application claims the benefit of U.S. Provisional Application No. 60/241,658 filed Oct. 19, 2000, and U.S. Provisional Application No. 60/263,731 filed Jan. 24, 2001.

TECHNICAL FIELD OF THE INVENTION

The present invention pertains to new chromophores. The novel chromophoric compounds are substituted-aryl compounds comprising a diazo linkage. Optimally the chromophores include a plurality of linkages which contribute to their unique absorption maximum and chromophoric properties, including optical nonlinear second-order properties. The novel optical nonlinear second-order compounds of the present invention are optionally employed in devices such as multifunctional optical switches or waveguides.

BACKGROUND OF THE INVENTION

Chromophores are molecules that selectively transmit and absorb color by virtue of their possession of certain chemical groups (e.g., nitrite(—$NO_2$), diazo(—N=N—), triphenylmethane, quinoneimine, xanthene, anthraquinone, or the like). The color of a chromophore is created by an electronic transition between the highest occupied molecular orbital (HOMO) and the lowest unoccupied molecular orbital LUMO) present in the chromophore following absorption of incoming light. Due to their possession of color, chromophores can be employed in a wide variety of diverse applications. For instance, chromophores can be employed as "labels" or a means of detection, for example, in diagnostic applications, forensics applications, laboratory studies, and the like. More recently, chromophores have been employed in the telecommunications industry, for example, to convert light into electrical current (Shi et al., *Science*, 288, 119–122 (April 2000)), as components of a multifunctional optical switch or waveguide (e.g., U.S. Ser. No. 09/357,201 and PCT/US00/19921), and for other uses.

These more recent applications, e.g., as an optical waveguide or switch, use a chromophore to change or add optical properties by modifying the backbone of a polymer. However, addition of a chromophore to molecules other than polymers is well known and has been described in the and Modification of a polymer backbone, and particularly a polyimide backbone with different chromophores also is known in the art, and is described, for instance, in Marder et al., *Nature*, 388, 845–851 (1997); Saaedeh et al., "Polyimides with a Diazo Chromophore Exhibiting High Thermal Stability and Large Electrooptic Coefficients", *Macromolecules*, 30 (18), 5403–5407 (1997); Yu et al., "Novel Second-Order Nonlinear Optical, Aromatic and Aliphatic Polyimides Exhibiting High-Temperature Stability", *Applied Physics Letters*, 66, 1050–1052 (1995); Yu et al., "Novel Second-Order Nonlinear Optical Polyimides," *Society of Photooptical Instrumentation Engineers*, 2527, 127–136; U.S. Ser. No. 09/357,201; and PCT/US00/19921). These modifications expand the responsiveness of the polyimide to different wavelengths of light Chromophoric compounds suitable for use as an optical waveguide or switch optimally have a low dielectric constant and include for instance, those described in U.S. Pat. No. 5,318,729; U.S. Ser. No. 09/357,201;PCT/US00/19921, and by Moylan et al. *J. Am. Chem. Soc.* 115, 12599–12600 (1993); *Polymers for Second-Order Nonlinear Optics*, ACS Symposium Series 601, 66, (1995); and Miller et al. *Chem. Mater.*, 6,1023–1032(1994). Despite the existence of these few compounds, a considerably larger inventory of photonic materials, preferably which exhibit second-order nonlinear optical (2°-NLO) properties, and optimally which have a low dielectric constant, are needed to meet the increasingly sophisticated demands of the telecommunications industry. The provision of further chromophores, especially 2°-NLO chromophores, would increase the availability of novel, useful photonic materials. Optionally such further chromophores also can be employed for other applications, e.g., as labels in applications outside the telecommunications industry.

The present invention accordingly provides novel chromophores. Preferably these chromophores exhibit 2°-NLO properties. Optimally such chromophores can be employed in optical switches (particularly as described in U.S. Ser. No. 09/357,201, and PCT/US00/19921, incorporated by reference) that can perform several critical tasks for the telecommunications industry—e.g., wavelength division multiplexing, wavelength division demultiplexing, performance as an add/drop filter and/or interconnect device. These and other objects and advantages of the present invention, as well as additional inventive features, will be apparent from the following description of the invention provided herein.

BRIEF SUMMARY OF THE INVENTION

The present invention provides novel substituted polyaryl chromophoric compounds which desirably comprise a single diazo group, and optimally include a plurality of diazo groups.

One aspect of the present invention pertains to novel substituted-polyaryl diazo-compounds of the following formula (I):

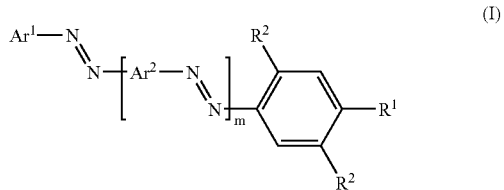

wherein $Ar^1$ is selected from the group consisting of:

-continued

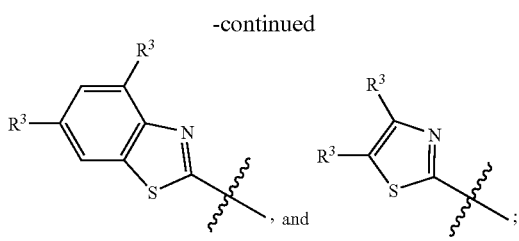
, and $Ar^2$ is selected from the group consisting of:

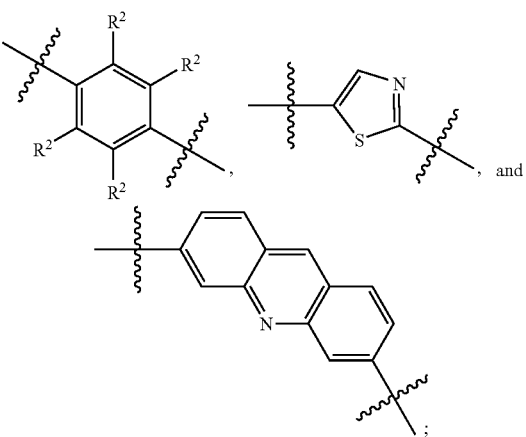
, and

;

and if m=0; $R^1$ is an electron donating group selected from the group consisting of hydrogen, hydroxy, $C_{2-12}$alkoxy (optionally substituted with hydroxyl or amino), $C_{7-12}$dialkylamino (optionally substituted with hydroxyl or amino), and $C_{1-12}$alkylarylamino, (optionally substituted with hydroxyl or amino); $R^2$ is hydrogen, $C_{1-12}$alkyl, carboxy, hydroxy, $C_{1-12}$alkoxy, or halo; and at least one of the groups $R^3$, $R^4$ and $R^5$ is an electron withdrawing group selected from the group consisting of hydrogen; cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), and arylsulfonyl (optionally substituted); while the other of the groups $R^3$, $R^4$ and $R^5$ are, independently, $C_{1-12}$alkyl, hydroxy, $C_{1-12}$alkoxy, amino, $C_{1-12}$alkylarylamino (optionally substituted with hydroxyl or amino), diarylamino, (optionally substituted with hydroxyl or amino), hydrogen, cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted); and if m=1; $R^1$ is an electron donating group selected from the group consisting of hydrogen, hydroxy, amino, and $C_{1-12}$alkoxy (optionally substituted with hydroxyl or amino), $C_{1-12}$dialkylamino (substituted with hydroxyl or amino), $C_{1-12}$alkylarylamino (optionally substituted with hydroxyl or amino), and diarylamino (optionally substituted with hydroxyl or amino); $R^2$ is hydrogen, $C_{1-12}$alkyl, carboxy, hydroxy, $C_{1-12}$alkoxy, or halo; and at least one of the groups $R^3$, $R^4$ and $R^5$ is an electron withdrawing group selected from the group consisting of hydrogen, cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted) and arylsulfonyl (optionally substituted); while the other of the groups $R^3$, $R^4$ and $R^5$ are, independently, $C_{1-12}$alkyl, hydroxy $C_{1-12}$alkoxy, amino, $C_{1-12}$alkylarylamino (optionally substituted with hydroxyl or amino), diarylamino (optionally substituted with hydroxyl or amino), hydrogen, cyano, $COR^2$, $C_{1-12}$mono- or polyhaloalkyl, $C_{1-12}$alkenyl (substituted with an additional electron withdrawing group), halo, nitro, sulfonyl $C_{1-12}$alkylsulfonyl (optionally substituted), or arylsulfonyl (optionally substituted); and if m=2–9; $R^1$ is an electron donating group selected from the group consisting of hydrogen, hydroxy, amino, $C_{1-12}$alkoxy (optionally substituted with hydroxyl or amino), $C_{1-12}$dialkylamino (optionally substituted with hydroxyl or amino), $C_{1-12}$alkylarylamino (optionally substituted with hydroxyl or amino), and diarylamino (optionally substituted with hydroxyl or amino); $R^2$ is hydrogen, $C_{1-12}$alkyl, carboxy, hydroxy, $C_{1-12}$alkoxy, or halo; and at least one of the groups $R^3$, $R^4$ and $R^5$ is an electron withdrawing group selected from the group consisting of hydrogen, cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), and arylsulfonyl (optionally substituted); while the other of the groups $R^3$, $R^4$ and $R^5$ are, independently, $C_{1-12}$alkyl, hydroxy, $C_{1-12}$alkoxy, amino, $C_{1-12}$alkylarylamino (optionally substituted with hydroxyl or amino), diarylamino (optionally substituted with hydroxyl or amino), hydrogen, cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted).

The polyaryl compounds can comprise a single diazo functionality, and optimally comprises a plurality of diazo linkages (i.e., at least two linkages), and the compounds desirably comprise optical nonlinear second-order properties. Apart from being previously undescribed, the compounds of the invention furthermore are novel in that they absorb more in the UV or IR region than previously reported chromophoric compounds.

In another aspect, the subject invention relates to compounds which desirably exhibit 2°-NLO properties. The optical nonlinear second order compounds of the present invention also have unique light absorption maximum.

Another aspect of the invention is directed toward a composition containing said compounds in combination with optically acceptable polymer support.

Another aspect of this invention relates to compounds according to this invention that can be employed in devices such as a multifunctional optical switch. Other uses of the compounds of the invention would be apparent to one skilled in the art.

Additional features and variations of the invention will be apparent to those skilled in the art from the entirety of this application, including the detailed description, and all such features are intended as aspects of the invention. Likewise, features of the invention described herein can be recombined into additional embodiments that also are intended as aspects of the inventions irrespective of whether the combination of features is specifically mentioned above (or herein) as an aspect or embodiment of the invention (e.g., any one or more of the above aspects of the invention can be combined to produce a variety of substituted polyaryl chromophoric compounds with any desired properties). Also, only such limitations which are described herein as critical to the invention should be viewed as such; variations of the invention lacking limitations which have not been described herein as critical are intended as aspects of the invention. In addition to the foregoing, the invention includes, as an additional aspect, all embodiments of the invention narrower in scope in any way than the variations specifically mentioned above (and herein).

The detailed description and examples which follow are provided to enhance the understanding of the invention, but are not intended to limit the scope of the invention.

DETAILED DESCRIPTION OF THE INVENTION

The invention provides for novel substituted-polyaryl chromophoric compounds which desirably comprise a single diazo group, and optimally include a plurality of diazo groups.

As used herein, certain standard terms and phrases are employed in describing the invention. Some of the more commonly used terms and phrases have meanings, definitions, and explanations known in the art and are described in more detail below. Should there be any term that is left undefined, or any possible ambiguity in the meaning of a term, the broadest possible definition known in the optics/chemical fields that is consistent with the scope and goals of the invention is to be applied. Also, like numbering is used for the same compounds in the Scheme and in the descriptive text.

"Alkyl" refers to a cyclic, branched, or straight chain aliphatic group containing only carbon and hydrogen, for example, methyl, pentyl, and adamantyl. Alkyl groups can be unsubstituted or substituted with one or more substituents, e.g., halogen, alkoxy, acyloxy, amino, hydroxyl, mercapto, carboxy, benzyloxy, aryl, and benzyl. Alkyl groups can be saturated or unsaturated (e.g., containing alkenyl or alkynyl subunits at one or several positions). Typically, alkyl groups contain 1 to about 12 carbon atoms, preferably 1 to about 10, or 1 to about 8 carbon atoms.

"Aryl" refers to a monovalent aromatic carbocyclic or heterocyclic group having a single ring (e.g., phenyl), multiple rings (e.g., biphenyl), or multiple condensed rings (e.g., naphthyl or anthryl). Aryl groups can be unsubstituted or substituted with amino, hydroxyl, alkyl, heteroalkyl, alkoxy, halo, mercapto, sulfonyl, nitro, and other substituents. Typically, the aryl group is a substituted single ring compound. For example, the aryl group is a substituted phenyl ring.

The term "halo" or "halogen" is defined herein to include fluorine, bromine, chlorine, and iodine.

The term "alkoxy" is defined as —OR, wherein R is alkyl of one to twelve carbons attached to an oxygen forming such groups as methoxy, ethyloxy, butyloxy, and the like, and isomeric forms thereof The term "hydroxy" is defined as —OH.

The term "amino" is defined as —NR$_2$, wherein each R, independently, is alkyl or hydrogen.

The term "cyano" is defined as —CN.

The term "sulfonyl" is defined as HOSO$_2$—

The term "alkylsulfonyl" is defined as R—SO$_2$—, where R is alkyl.

The term "arylsulfonyl" is defined as R—SO$_2$—, where R is aryl.

The term "diazo" is defined as —N=N—.

The term "electron donating group" is defined as a group that tends to donate the electrons in a covalent bond away from itself Unless otherwise specified, any appropriate electron donating group can be employed according to the invention. Similarly, "optionally substituted" indicates that any appropriate group can be employed for substitution.

The term "electron withdrawing group" is defined as a group that tends to attract or draw the electrons in a covalent bond toward itself. Unless otherwise specified, any appropriate electron withdrawing group can be employed according to the invention.

The chemical formulas representing various compounds or molecular fragments in the specification and claims may contain variable substituents in addition to expressly defined structural features. These variable substituents are identified by a letter or a letter followed by a numerical superscript, for example, "Ar$^m$" or "R$^m$" where "i" is an integer. These variable substituents are either monovalent or bivalent, that is, they, represent a group attached to the formula by one or two chemical bonds. Groups R$^i$ and R$^j$ represent monovalent variable substituents if attached to the formula CH$_3$—CH$_2$—C(R$^i$)(R$^j$)H. When chemical formulas are drawn in a linear fashion, such as those above, variable substituents contained in parenthesis are bonded to the atom immediately to the left of the variable substituent enclosed in parenthesis. When two or more consecutive variable substituents are enclosed in parenthesis, each of the consecutive variable substituents is bonded to the immediately preceding atom to the left which is not enclosed in parentheses. Thus, in the formula above, both R$^i$ and R$^j$ are bonded to the preceding carbon atom.

Chemical formulas or portions thereof drawn in a linear fashion represents atoms in a linear chain. The symbol "—" in general represents a bond between two atoms in the chain. Thus, "HO—CH$_2$—CH(R$^j$)—CH$_3$" represents a 2-substituted-1-hydroxypropane compound. In a similar fashion, the symbol "=" represents a double bond, e.g., NH$_2$=N(R$^j$)—CH$_3$.

The carbon atom content of variable substituents is indicated in one or two ways. The first method uses a prefix to the entire name of the variable such as "C$_1$–C$_4$", where both "1" and "4" are integers representing the minimum and maximum number of carbon atoms in the variable. The prefix is separated from the variable by a space. For example, "C$_1$–C$_4$ alkyl" represents alkyl of 1 through 4 carbon atoms, (including isomeric forms thereof unless an express indication to the contrary is given). Whenever this single prefix is given, the prefix indicates the entire carbon atom content of the variable being defined. Thus C$_2$–C$_4$ alkoxy describes a group CH$_3$—(CH$_2$)$_n$—O where n is zero, one or two. By the second method, the carbon atom content of only each portion of the definition is indicated separately by enclosing the "C$_i$–C$_j$" designation in parentheses and placing it immediately (no intervening space) before the portion of the definition being defined. By this optional convention (C$_1$–C$_3$) alkoxycarbonyl has the same meaning as C$_2$–C$_4$ alkoxycarbonyl because the "C$_1$–C$_3$" refers only to the carbon atom content of the alkoxy group. Similarly while both C$_2$–C$_6$ alkoxyalkyl and (C$_1$–C$_3$) alkoxy-(C$_1$–C$_3$) alkyl define alkoxyalkyl groups containing from 2 to 6 carbon atoms, the two definitions differ since the former definition allows either the alkoxy or alkyl portion alone to contain 4 or 5 carbon atoms while the latter definition limits either of these groups to 3 carbon atoms. With respect to the above definition, C$_{1-7}$ alkyl is methyl, ethyl, propyl, butyl, pentyl, hexyl, and the like, and isomeric forms thereof.

The invention pertains to novel substituted-polyaryl diazo compounds which exhibit 2°-NLO properties as described herein and that among other things, desirably can be utilized in a waveguide or multifunctional optical switch. Formula (I) depicts the chemical structure of a diazo compound according to the present invention:

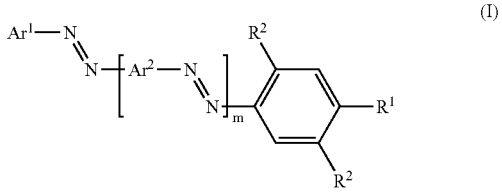

wherein Ar¹ is selected from the group consisting of:

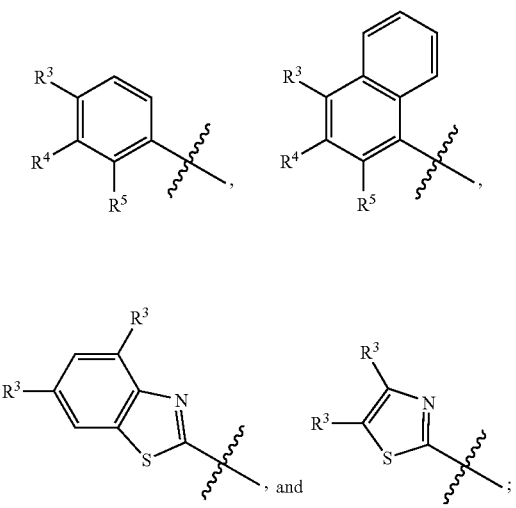

Ar² is selected from the group consisting of:

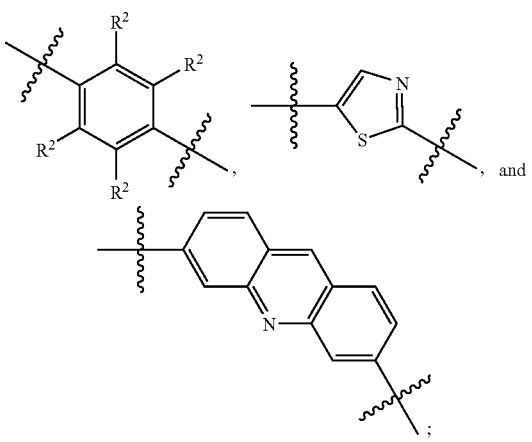

and if m=0; R¹ is an electron donating group selected from the group consisting of hydrogen, hydroxy, $C_{2-12}$alkoxy (optionally substituted with hydroxyl or amino), $C_{7-12}$dialkylamino (optionally substituted with hydroxyl or amino), and $C_{1-12}$alkylarylamino, (optionally substituted with hydroxyl or amino); R² is hydrogen, $C_{1-12}$alkyl, carboxy, hydroxy, $C_{1-12}$alkoxy, or halo; and at least one of the groups R³, R⁴ and R⁵ is an electron withdrawing group selected from the group consisting of hydrogen, cyano, COR², $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), and arylsulfonyl (optionally substituted); while the other of the groups R³, R⁴ and R⁵ are, independently, $C_{1-12}$alkyl, hydroxy, $C_{1-12}$alkoxy, amino, $C_{1-12}$alkylarylamino (optionally substituted with hydroxyl or amino), diarylamino, (optionally substituted with hydroxyl or amino), hydrogen, cyano, COR², $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted); and if m=1; R¹ is an electron donating group selected from the group consisting of hydrogen, hydroxy, amino, and $C_{1-12}$alkoxy (optionally substituted with hydroxyl or amino), $C_{1-12}$dialkylamino (substituted with hydroxyl or amino), $C_{1-12}$alkylarylamino (optionally substituted with hydroxyl or amino), and diarylamino (optionally substituted with hydroxyl or amino); R² is hydrogen, $C_{1-12}$alkyl, carboxy, hydroxy, $C_{1-12}$alkoxy, or halo; and at least one of the groups R³, R⁴ and R⁵ is an electron withdrawing group selected from the group consisting of hydrogen, cyano, COR², $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted) and arylsulfonyl (optionally substituted); while the other of the groups R³, R⁴ and R⁵ are, independently, $C_{1-12}$alkyl, hydroxy, $C_{1-12}$alkoxy, amino, $C_{1-12}$alkylarylamino (optionally substituted with hydroxyl or amino), diarylamino (optionally substituted with hydroxyl or amino), hydrogen, cyano, COR², $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted); and.

if m=2–9; R¹ is an electron donating group selected from the group consisting of hydrogen, hydroxy, amino, $C_{1-12}$alkoxy (optionally substituted with hydroxyl or amino), $C_{1-12}$dialkylamino (optionally substituted with hydroxyl or amino), $C_{1-12}$alkylarylamino (optionally substituted with hydroxyl or amino), and diarylamino (optionally substituted with hydroxyl or amino); R² is hydrogen, $C_{1-12}$alkyl, carboxy, hydroxy, $C_{1-12}$alkoxy, or halo; and at least one of the groups R³, R⁴ and R⁵ is an electron withdrawing group selected from the group consisting of hydrogen, cyano, COR², $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), and arylsulfonyl (optionally substituted); while the other of the groups R³, R⁴ and R⁵ are, independently, $C_{1-12}$alkyl, hydroxy, $C_{1-12}$alkoxy, amino, $C_{1-12}$alkylarylamino (optionally substituted with hydroxyl or amino), diarylamino (optionally substituted with hydroxyl or amino), hydrogen, cyano, COR²$C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted).

The chromophoric compounds of this invention are prepared as described briefly here and in more detail in the examples which follow. Scheme 1 illustrates the general method and specific examples of synthesizing the chromophoric compounds of the invention, as further described in the Examples which follow.

Scheme 1.

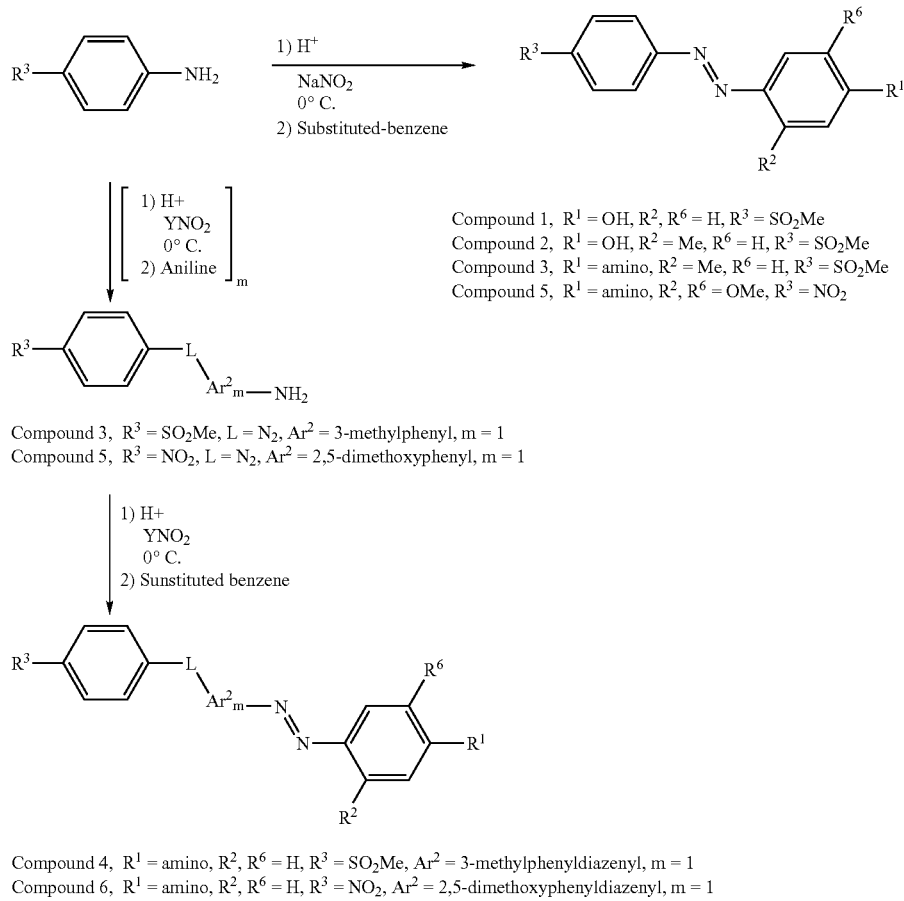

Compound 3, R³ = SO₂Me, L = N₂, Ar² = 3-methylphenyl, m = 1
Compound 5, R³ = NO₂, L = N₂, Ar² = 2,5-dimethoxyphenyl, m = 1

Compound 4, R¹ = amino, R², R⁶ = H, R³ = SO₂Me, Ar² = 3-methylphenyldiazenyl, m = 1
Compound 6, R¹ = amino, R², R⁶ = H, R³ = NO₂, Ar² = 2,5-dimethoxyphenyldiazenyl, m = 1

Preferably, chromophores are synthesized using as a starting point an appropriately substituted aniline, preferably containing a electron withdrawing group (EWG) at the 4-position (R¹), such as a cyano, carbonyl, $C_{1-12}$mono- or polyhaloalkyl, $C_{1-12}$alkenyl, substituted with an additional electron withdrawing group; halo, nitro, sulfonyl $C_{1-12}$alkylsulfonyl or arylsulfonyl derivative. These materials are readily available from a number of commercial vendors or alternatively, are known in the chemical literature and may be readily prepared by one skilled in the art. These aniline compounds are then subsequently reacted following procedures known, or readily acquired by one skilled in the art. In one embodiment, the appropriately substituted aniline is first treated with an acid catalyst and a diazotizing reagent, such as sodium nitrite (Y=Na) or nitrosyl sulfuric acid (Y=HSO₃), and then subsequently treated with an sufficiently electron rich, substituted-benzene such that the subsequent aromatic substitution reaction provides, in a one-pot reaction sequence, the respective crude diazo-linked, substituted diary compounds (Compounds 1–3,5) in moderate to high yields (i.e., Scheme 1, reaction depicted proceeding right). The products (Compounds 1–3,5) may then be further purified following chromatographic techniques well known in the art. Examples of acid catalysts that can be used include hydrochloric acid, phosphoric acid, and sulfuric acid. Examples of electron rich, substituents on benzene include, but are not limited to, $C_{1-12}$alkyl, hydroxyl, $C_{1-12}$alkoxy, amino, $C_{1-12}$dialkylamino, and the like, and combinations thereof.

In another embodiment, the substituted-polyaryl compounds of the invention have multiple diazo linking groups between the substituted aryl groups. In these cases the extended diazo-linkage is formed prior to the substitution reaction with the final electron rich, substituted-benzene. This is also shown in Scheme 1 (i.e., reaction depicted proceeding downward). For example, the starting aniline is treated with an acid catalyst and diazotizing reagent, such as sodium nitrite or nitrosyl sulfuric acid, as in the method above, and then subsequently treated with another, substituted-aniline such that the subsequent aromatic substitution reaction provides a diazo-linked arylaniline intermediate (Compounds 3 and 5). This process can be repeated multiple times to form polydiazo aryl aniline intermediates before terminating the reaction sequence by reaction with the final electron rich, substituted-benzene (Compounds 4 and 6).

A third embodiment to produce the substituted-polyaryl compounds of the invention involves a similar set of reactions as that disclosed in Scheme 1 with either a substituted 2-amino-benzothiazole or a substituted 2-amino-thiazole instead of the starting substituted aniline. Examples of some substituted-polyaryl-diazo chromophoric compounds of the present invention are given in Table 1 and Table 2.

TABLE 1

Phenyl diazo chromophores $$R^3\text{-}R^4\text{-}R^5\text{-phenyl-}N=N\text{-}[\text{phenyl}(R^{2''}, R^{2'''})\text{-}N=N]_m\text{-phenyl-}R^{2'}, R^1, R^2$$

| Compound # | m | $R^1$ | $R^2$ | $R^{2'}$ | $R^{2''}$ | $R^{2'''}$ | $R^3$ | $R^4$ | $R^5$ |
|---|---|---|---|---|---|---|---|---|---|
| 1 | 0 | OH | H | H | — | — | $SO_2CH_3$ | H | H |
| 2 | 0 | OH | $CH_3$ | H | — | — | $SO_2CH_3$ | H | H |
| 3 | 0 | $NH_2$ | $CH_3$ | H | — | — | $SO_2CH_3$ | H | H |
| 4 | 1 | OH | H | H | $CH_3$ | H | $SO_2CH_3$ | H | H |
| 5 | 0 | $NH_2$ | $OCH_3$ | $OCH_3$ | — | — | $NO_2$ | H | H |
| 6 | 1 | $N(C_2H_5)(C_2H_4OH)$ | H | H | $OCH_3$ | $OCH_3$ | $NO_2$ | H | H |
| 7 | 0 | $NH_2$ | H | H | H | H | $CF_3$ | H | H |
| 8 | 0 | $N(C_2H_5)(C_2H_4OH)$ | H | H | H | H | $CF_3$ | H | $NO_2$ |
| 9 | 0 | $NH_2$ | H | H | $CH_3$ | H | $CF_3$ | H | $NO_2$ |
| 10 | 0 | $N(C_2H_5)(C_2H_4OH)$ | H | H | H | H | $NO_2$ | $CF_3$ | H |
| 11 | 0 | $NH_2$ | H | H | $CH_3$ | H | $NO_2$ | $CF_3$ | H |
| 12 | 0 | $NH_2$ | H | H | $CH_3$ | H | $NO_2$ | H | $NO_2$ |
| 13 | 1 | $OC_8H_{17}$ | H | H | $CH_3$ | H | $SO_2CH_3$ | H | H |
| 14 | 1 | $N(C_2H_5)_2$ | H | H | $CH_3$ | H | $SO_2CH_3$ | H | H |
| 15 | 1 | OH | $CH_3$ | H | $CH_3$ | H | $SO_2CH_3$ | H | H |
| 16 | 1 | OH | H | H | $CH_3$ | H | $NO_2$ | H | H |
| 17 | 1 | OH | $CH_3$ | H | $CH_3$ | H | $NO_2$ | H | H |
| 18 | 1 | $O(CH_2)_7OH$ | H | H | $CH_3$ | H | $CF_3$ | H | H |
| 19 | 1 | $N(C_2H_5)(C_2H_4OH)$ | H | H | $OCH_3$ | $OCH_3$ | $NO_2$ | H | H |
| 20 | 1 | $NH_2$ | $CH_3$ | H | H | H | $NO_2$ | H | H |
| 21 | 1 | $O(CH_2)_7OH$ | H | H | $CH_3$ | H | $SO_2CH_3$ | H | H |
| 22 | 1 | OH | H | H | $CH_3$ | H | $CF_3$ | H | H |
| 23 | 1 | OH | H | H | $CH_3$ | H | F | H | H |
| 24 | 1 | $N(C_2H_5)(C_2H_4OH)$ | H | H | $CH_3$ | H | $CF_3$ | H | $NO_2$ |
| 25 | 1 | $N(C_2H_5)(C_2H_4OH)$ | H | H | $CH_3$ | H | $NO_2$ | $CF_3$ | H |
| 26 | 1 | $N(C_2H_5)(C_2H_4OH)$ | H | H | $CH_3$ | H | $NO_2$ | H | $NO_2$ |
| 27 | 1 | $NH_2$ | $CH_3$ | H | $CH_3$ | H | $NO_2$ | H | $NO_2$ |
| 28 | 1 | OH | H | H | H | $CO_2H$ | $SO_2CH_3$ | H | H |
| 29 | 1 | OH | H | H | $CH_3$ | H | $SO_2CH_3$ | H | H |
| 30 | 1 | $NH_2$ | $CH_3$ | H | $CH_3$ | H | $SO_2CH_3$ | H | H |
| 31 | 2 | $N(C_2H_5)_2$ | H | H | $CH_3$ | H | $SO_2CH_3$ | H | H |
| 32 | 2 | $N(C_2H_5)(C_2H_4OH)$ | H | H | $CH_3$ | H | $SO_2CH_3$ | H | H |
| 33 | 2 | OH | H | H | $CH_3$ | H | $SO_2CH_3$ | H | H |
| 34 | 2 | $O(CH_2)_7OH$ | H | H | $CH_3$ | H | $SO_2CH_3$ | H | H |
| 35 | 2 | $O(CH_2)_7OH$ | H | H | H | H | $OCH_3$ | H | H |
| 36 | 2 | $NH_2$ | $CH_3$ | H | $CH_3$ | H | $SO_2CH_3$ | H | H |
| 37 | 2 | OH | H | H | $CH_3$ | H | $NO_2$ | H | H |
| 38 | 2 | $OC_8H_{17}$ | H | H | $CH_3$ | H | $NO_2$ | H | H |
| 39 | 2 | $NCH_3(C_8H_{17})$ | H | H | $CH_3$ | H | $NO_2$ | H | H |
| 40 | 2 | $NH_2$ | H | H | $CH_3$ | H | $NO_2$ | H | H |
| 41 | 2 | $N(C_2H_5)(C_2H_4OH)$ | H | H | $CH_3$ | H | $NO_2$ | H | $NO_2$ |
| 42 | 3 | $N(C_2H_5)_2$ | H | H | $CH_3$ | H | $SO_2CH_3$ | H | H |
| 43 | 3 | OH | H | H | $CH_3$ | H | $SO_2CH_3$ | H | H |
| 44 | 3 | $NCH_3(C_8H_{17})$ | H | H | $CH_3$ | H | $NO_2$ | H | H |

TABLE 2

Heteroaryl diazo chromophores $$Ar^1-N=N-Ar^2\left[\begin{array}{c}N=N-Ar^3\end{array}\right]_m$$

| Compound # | m | Ar¹ | Ar² | Ar³ |
|---|---|---|---|---|
| 45 | 0 | 4-NO₂—Ph—SO₂-(2-methylthiazol-5-yl) | 3,4-dimethylphenyl (with NH₂) | |
| 46 | 0 | 4-methyl-2,5-dinitrophenyl | 5-methyl-2-aminothiazole | |
| 47 | 0 | 2-methyl-5-nitrothiazole | 5-methyl-2-aminothiazole | |
| 48 | 0 | 2-methyl-6-nitrobenzothiazole | 5-methyl-2-aminothiazole | |
| 49 | 1 | 4-methyl-2,5-dinitrophenyl | 2,4-dimethylphenyl | 4-aminophenyl (NH₂) |
| 50 | 1 | 4-methyl-2,5-dinitrophenyl | 2,4-dimethylphenyl | 4-NEt(EtOH)-phenyl |
| 51 | 1 | 4-NO₂—Ph—SO₂-(2-methylthiazol-5-yl) | 2,4-dimethylphenyl | 4-NEt(EtOH)-phenyl |
| 52 | 1 | 4-methyl-2,5-dinitrophenyl | 2,5-dimethylthiazole | 4-NEt₂-phenyl |
| 53 | 1 | 2-methyl-5-nitrothiazole | 2,5-dimethylthiazole | 4-NEt₂-phenyl |

TABLE 2-continued

Heteroaryl diazo chromophores $$\left[\begin{array}{c}\phantom{Ar^1-N}\diagdown N=N\diagup^{Ar^3}\\ N-Ar^2\diagup\\ Ar^1-N\diagup\end{array}\right]_m$$

| Compound # | m | Ar¹ | Ar² | Ar³ |
|---|---|---|---|---|
| 54 | 1 | O₂N-[benzothiazole] | [thiazole] | [C₆H₄-NEt₂] |
| 55 | 1 | (EtOH)EtN-[phenyl] | [acridine] | [C₆H₄-NEt(EtOH)] |

The substituted-polyaryl diazo chromophoric compounds of the invention preferably comprise second-order nonlinear optical (2°-NLO) properties as set forth herein, and further described below. A second-order nonlinear optical (2°-NLO) compound is a compound that is "optically active"—i.e., its index of refraction changes due to an applied electric field, and the change is proportional to the square of the applied electric field. The electric field is generated with any appropriate power source (e.g., AC or DC power source), and communicated to a chromophore (e.g., present in a polymer contained in an optical waveguide or switch) by means of an electrode. Any electrode having the ability to conduct charge and capable of functioning as an "electrode" as that term is understood in the art can be employed. Generally, an electrode need only supply a small amount of voltage, e.g., from 0 to about 50 volts, although in certain applications, it may be preferable to employ a higher voltage.

Desirably, for use in an optical waveguide or switch, a chromophore according to the invention has an absorption wavelength from between about 200 nm and about 800 nm, preferably from between about 300 nm and about 600 nm. The preferred chromophores according to the invention also desirably have an effective cis-trans isomerization process when excited at their absorption wavelengths. Also, desirably, the chromophores are such that polarization alone can be used to induce alignment in the chromophores (e.g., as described in Rochon et al., "Optically Induced and Erased Birefringence and Dichroism in Azoaromatic Polymers", *Appl. Phys. Lett.* 60, pages 4–5 (1992); Kim et al., "Laser Induced Holographic Surface Relief gratings on Nonlinear Optical Polymer Films", *Appl. Phys. Lett.* 66, pages 1166–1168, (1995)) which is helpful in preparing optical waveguides or switches. Optimally this induced alignment will be in the direction to reduce interaction with the incident polarized light. These materials according to the invention thus provide great flexibility in terms of chemical modification, such modification which may be desirable in optimizing the properties of the compound for use in optical applications (although uses for the chromophores other than in optic switches and waveguides are contemplated accord ing to the invention). For instance, from a dialkyl amino nitro diazo compound it is possible to change the electron donor in the chromophore from nitrogen to oxygen and the electron acceptor from nitro to sulfone to get an alkoxy sulfone diazo compound.

According to the invention, and, as further described below, an optical switch or waveguide can be obtained that utilizes the compounds disclosed herein with 2°-NLO properties. In particular, compounds disclosed herein can be utilized in an optical switch or waveguide as described in U.S. Ser. No. 09/357,201 and PCT/US00/19921, incorporated by reference in their entireties. A "waveguide" is an entity of material boundaries or structures for guiding electromagnetic waves or energy (i.e., carrying one or more optical signals). An "optical switch" is a device that is capable of changing the path of light from one waveguide to another (e.g., an optical wavelength division multiplexer/demultiplexer, optical add/drop multiplexer, and/or optical interconnect). A "device" includes a single entity such as a waveguide or any combination of elements (e.g., optical switch such as optical wavelength division multiplexer/demultiplexer, optical add/drop multiplexer, optical interconnect, and the like) either alone, or, in a higher level of organization (e.g., present in a system or subsystem such as a board or motherboard). The compounds with 2°-NLO properties that are utilized in these devices are typically obtained by chemical conjugation of a 2°-NLO chromophore onto a polymer or by merely mixing a 2°-NLO chromophore with a polymer in a process commonly known as "doping" (e.g., as described in Marder et al., supra, Saaedeh et al., supra, Yu et al., supra, U.S. Ser. No. 09/357, 201, PCT/US00/19921, and references cited therein, as well as in other references). This renders it possible to induce and manipulate the refractive index of the polymer films by using the appropriate wavelength of light. The chromophore incorporated in the polyimide can be any chromophore, but desirably is a chromophore including, but not limited to: (a) the novel chromophores described herein, or (b) those chromophores depicted in Table 3 (which are known and have been described in the art). In Table 3 below, "μ" is the dipolar moment of the molecule, "β" is the hyperpolarizability, and "λ" is the wavelength

TABLE 3

$$R^3 \!-\!\!\left\langle\!\!\bigcirc\!\!\right\rangle\!\!-\!\!\left[\!\!N\!\!=\!\!N\!\!-\!\!\left\langle\!\!\bigcirc\!\!\right\rangle\!\!\right]_m\!\!-\!\!N\!\!=\!\!N\!\!-\!\!\left\langle\!\!\bigcirc\!\!\right\rangle\!\!-\!\!R^1$$

| m | $R^1$ | $R^3$ | $\mu\beta \times 10^{48}$ (esu) | $\lambda$max (nm) |
|---|---|---|---|---|
| 0 | $N(CH_3)_2$ | $NO_2$ | 751 | 480 |
| 0 | $N(CH_3)_2$ | $NO_2$ | 788 | 486 |
| 0 | $N(Ph)_2$ | $NO_2$ | 996 | 494 |
| 0 | $N(C_2H_5)_2$ | $CHC(CN)_2$ | 1,360 | 526 |
| 0 | $N(Ph)_2$ | $C_2(CN)_3$ | 2,776 | 602 |
| 1 | $N(4\text{-}NH_2Ph)_2$ | $NO_2$ | 19,000 | 504 |
| 1 | $N(C_2H_5)_2$ | $C_2(CN)_3$ | 24,000 | — |

The concentration of chromophores in a polymer can be carefully adjusted by copolymerization to control the refractive index at the expense of the nonlinearity (e.g., as described in Girton et al., "Electrooptic Polymer Mach-Zehnder Modulator", In ACS Symposium Series 601, *Polymers for Second-Order Nonlinear Optics* (Washington D.C. 1995) 456–468, and Keil, "Realization of IO-Polymer-Components and present state in Polymer Technology", *In, Intergrated Optics and Micro-Optics with Polymers* (Stuttgart-Leipzeig: B. G. Teubner Verlagsgesellscaft, 1993), 273). In "doping" techniques it is preferable that the concentration of the chromophore be between about 3% and about 10% of the total polymer mixture. By changing the pendant chromophore in the polymer employed, devices having unique and highly differentiable optical properties can be obtained. Other variations such as would be obvious to one skilled in the art are contemplated by the invention. Thus, the present invention optimally provides for a uniquely designed family of substituted-polyaryl diazo chromophoric compounds, which can be optionally combined with polymers to be used in devices, such as a optical switch.

The invention will now be described with reference to the following illustrative Examples. The following Examples are by means of illustration, not limitation. Of course, variation of these Examples in the spirit and scope of the invention are contemplated herein.

EXAMPLE 1

Preparation of 1-[(4-hydroxyphenyl)diazenyl]-4-(methylsulfonyl)benzene (Compound 1)

As described herein, the structure of 1-[(4-hydroxyphenyl)diazenyl]-4(methylsulfonyl)benzene (Compound 1) is:

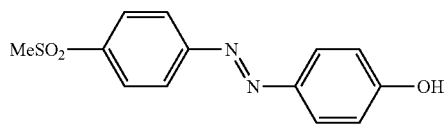

In this Example and all subsequent Examples, reagents were purchased from Aldrich, Acros, or Sigma and used without further purification. However, comparable materials from other vendors can be employed instead. All temperatures are in degrees Centigrade. When solvent pairs are used, the ratios of solvents used are volume/volume (v/v). When the solubility of a solid in a solvent is used, the ratio of the solid to the solvent is weight/volume (wt/v). Reactions with moisture-sensitive reagents were performed under nitrogen atmosphere. Determination of the concentration of solutions after workup was performed by reduced pressure rotary evaporation. Preparative thin-layer chromatography (TLC) were performed using EM silica gel (SG) 60 F254 plates (20×20 cm, thickness 2 mm). NMR refers to nuclear magnetic resonance spectroscopy; $^1$H NMR refers to proton nuclear magnetic resonance spectroscopy with chemical shifts reported in ppm downfield from tetramethylsilane. Mass-spectra (MS) refers to mass spectrometry expressed as m/e or mass/charge unit and was obtained using electron impact (EI) technique. [M+H]$^+$ refers to the positive ion of a parent plus a hydrogen atom. IR refers to infrared spectroscopy; FTIR refers to Fourier Transform IR.

For these studies, p-Methylsulfonylaniline (Ulman, A. et. al., *JACS*, 112, 7083,(1990)) (0.96 g, 5.61 mmol) was sequentially treated with hydrogen chloride (HCl) (10 ml of a 6M solution, 6 mmol) and sodium nitrite (0.426 g, 6.18 mmol) while the temperature was maintained between 0–5° C. The reagents were allowed to dissolve and the resulting solution was allowed to stir for about 15 minutes. The resulting diazonium compound was then treated with hydrogen tetrafluoroborate to give a tetrafluoroborate diazonium salt. The resulting tetrafluoroborate ($BF_4$) diazonium salt was divided into two portions. Half of the diazonium salt was added to a solution of phenol (0.22 g, 2.3 mmol) and potassium hydroxide (KOH) (0.11 g, 2 mmol) in tetrahydrofuran (THF). The resulting orange-red mixture was stirred for 0.5 h and then neutralized with acetic acid (HOAc) to give a yellow-orange solid. This solid was filtered and recrystallized from THF/Hexanes to give 0.4 g (63%) of Compound 1.

EXAMPLE 2

Preparation of 1-[(4-hydroxy-2-methylphenyl)diazenyl]-4-(methylsulfonyl)benzene (Compound 2)

As described herein, the structure of 1-[(4-hydroxy-2-methylphenyl)diazenyl]-4-(methylsulfonyl)benzene (Compound 2) is:

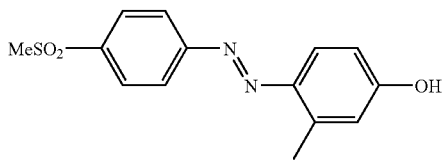

For these studies, half of the diazonium salt from example 1 was added to a solution of m-cresol (0.285 g, 2.34 mmol) and KOH (0.13 g, 2 mmol) in THF. The resulting red mixture was stirred for 0.5 h and then neutralized with HOAc to give a orange solid. This solid was filtered and recrystallized from THF/Hexanes to give 0.35 g (58%) of Compound 2.

EXAMPLE 3

Preparation of 1-[(4-amino-2-methylphenyl)diazenyl]-4-(methylsulfonyl)benzene (Compound 3)

As described herein, the structure of 1-[(4-amino-2-methylphenyl)diazenyl]-4-(methylsulfonyl)benzene (Compound 3) is:

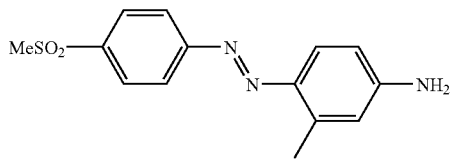

For their studies, p-Methylsulfonylaniline (1.42 g, 8.3 mmol) was sequentially treated with HCl (15 ml of a 6M solution, 9 mmol) and sodium nitrite (0.66 g, 9.12 mmol) while the temperature was maintained between 0–5° C. The reagents were allowed to dissolve and the resulting solution was allowed to stir for an about 15 minutes. The resulting diazonium compound was then treated with m-toluidine (0.9 g, 8.4 mmol) in THF, and allowed to stir for about 15 minutes to 1 h. To the resulting red-orange mixture was added sodium acetate NaOAc (2 g, 2 mmol) or water and allowed to stir for about 16 h. The precipitated orange solid was filtered, sequentially washed with water/ethanol and hexanes, and dried under vacuum and recrystallized from EtOAc/Hexane to give 1.96 g (73.3%) of Compound 3.

EXAMPLE 4

Preparation of 1-({4-[(4-hydroxyphenyl)diazenyl]-2-methylphenyl}diazenyl)-4-(methylsulfonyl)-benzene (Compound 4)

As described herein, the structure of 1-({4[(4-hydroxyphenyl)diazenyl]-2-methylphenyl}diazenyl)-4-(methylsulfonyl)-benzene (Compound 4) is:

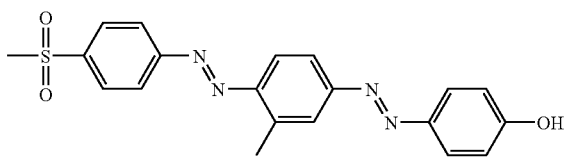

Compound 3 (0.85 g, 2:94 mmol) was sequentially treated with a HCl/phosphoric ($H_2PO_4$)/sulfuric acid ($H_2SO_4$) mixture and nitrosyl suilfric acid (5 ml) while the temperature was maintained at about −15° C. The reagents were allowed to dissolve and the resulting solution was allowed to stir for an about 15 minutes. The resulting diazonium mixture was then treated with urea (0.5 g), stirred for about 10 minutes; treated with hydrogen tetrafluoroborate (15 ml), and stirred for an additional 20 minutes to give the tetrafluoroborate diazonium salt. The resulting tetrafluoroborate ($BF_4$) diazonium salt was filtered then added to a solution of phenol (0.31 g, 3.2 mmol) and sodium hydroxide (NaOH) (0.15 g, 3 mmol1) or potassium hydroxide in THF/water (1:1). The resulting pink mixture was stirred for 0.5 h and then neutralized with 1N HCl to give a yellow-orange solid. This solid was filtered and recrystallized from THF/Hexanes or EtOH/$H_2O$ to give 0.92 g (79%) of Compound 4.

EXAMPLE 5

Preparation of 1-({4-[(4-(7-hydroxy-n-heptoxyphenyl)diazenyl]-2-methylphenyl}diazenyl)-4-(methylsulfonyl)-benzene (Compound 21)

As described herein, the structure of 1-({4-[(4-(7-hydroxy-n-heptoxyphenyl)diazenyl]-2-methylphenyl}diazenyl)-4-(methylsulfonyl)-benzene (Compound 21) is:

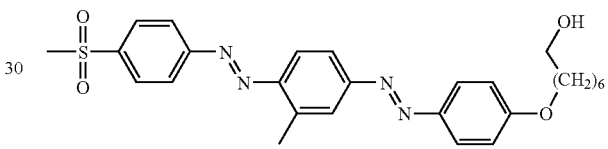

A mixture of compound 4(4.61 g, 11.7 mmol), 6-bromo-1-hexanol (2.50 g, 14.0 mmol), and $K_2CO_3$ (7.00 g, 70.0 mmol) in 35 mL of dry acetone was refluxed for 48 h. The resulting orange-red mixture was treated with $H_2O$ to dissolve excess $K_2CO_3$ and then filtered, washed thoroughly with $H_2O$ then dried. The solid was recrystallized from $CHCl_3$/Hexane to give compound 21 (6.90 g, 89.0%).

EXAMPLE 6

Preparation of 2[4-(1,3-dioxoisoindolin-2-yl)-2-(2-{4-[(3-methyl-4-{[4-(methylsulfonyl)phenyl]diazenyl}phenyl)diazenyl]phenoxy}ethoxyl)phenyl]isoindoline-1,3-dione (Compound 56)

As described herein, the structure of 2-[4-(1,3-dioxoisoindolin-2-yl)-2-(7-{4-[(3-methyl-4-{[4-(methylsulfonyl)phenyl]diazenyl}phenyl)diazenyl]phenoxy}heptoxy)phenyl]isoindoline-1,3-dione (Compound 56) is:

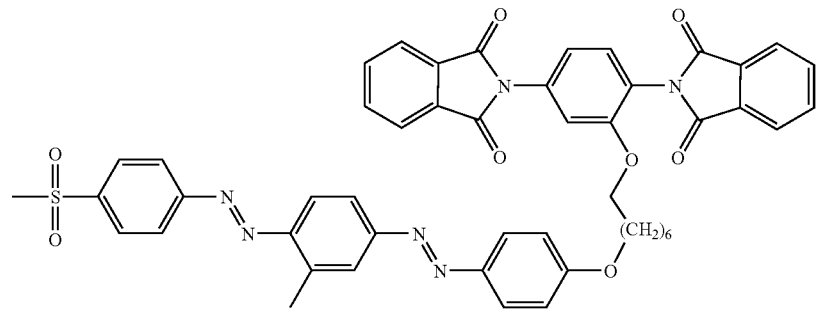

To a solution of 2-[4-(1,3-dioxoisoindolin-2-yl)-2-hydroxyphenyl]isoindoline-1,3-dione prepared as described in Yu et al. *Macromolecules* 28: 784 (1995); 29: 6139, (1996); and *J. Am. Chem. Soc.* 117: 11680 (1995) (1.82 g, 4.76 mmol) 60 mL of anhydrous DMF under $N_2$, was added compound 21 (2.35 g, 4.76 mmol) and triphenylphosphine (1.90 g, 7.30 mmol). The resulted solution was treated dropwise with a solution of diethylazidocarboxylate (1.27 g, 7.3 mmol) in 5 mL of anhydrous DMF. The reaction mixture was stirred for five hours, then precipitated into 100 mL of methanol. The product was collected by filtration and chromatographed using $CHCl_3$/MeOH (99:1) to give compound 56 (1.90 g, 47%), $^1$H NMR (CDCl$_3$) δ 8.1 (d, J=8.7 Hz, 2H), 8.1 (d, J=8.7 Hz, 2H), 8.0 (d, 2H), 7.9 (s, 1H), 7.8 (m, 2H), 7.0 (d, J=8.9 Hz, 2H), 4.1 (t, J=6.5 Hz, 2H), 3.7 (t, J=6.5 Hz, 2H), 3.4 (t, J=6.4 Hz, 1H), 3.1 (s, 3H), 2.8 (s, 3H), 1.8 (m, 2H), 1.5 (m, 6H). Compound 56 was incorporated into a polymer backbone following the literature procedure described in Saadeh et al., *Macromolecules* 30(18): 5403 (1997). A $^1$H NMR spectra was obtained.

EXAMPLE 7

Preparation of 1-[(4amino-2.5-dimethoxyphenyl) diazenyl]-4-nitrobenzene (Compound 5)

As described herein, the structure of 1-[(4-amino-2,5-dimethoxyphenyl) diazenyl]-4-nitrobenzene (Compound 5) is:

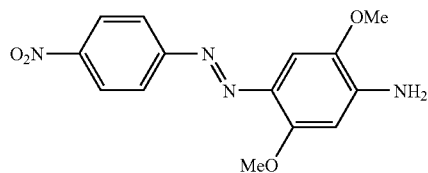

A diazonium salt synthesized from 4-nitroaniline using the procedure of example 1 (1.4 g, 5.9 mmol) was added portionwise to a solution of 2,4-dimethoxyaniline (0.97 g, 6.3 mmol) in dimethylformamide DMF) (20 ml). The resulting red mixture was stirred for 1.5 h, filtered, and the resulting solid recrystallized from ethyl acetate (EtOAc)/Hexanes to give 1.3 g (70.6%) of Compound 5.

EXAMPLE 8

Preparation of 1-({4-[(4-(2-hydroxyethyl)ethylaminophenyl)diazenyl]-2.5-dimethoxyphenyl}diazenyl)-4-nitrobenzene (Compound 6)

As described herein, the structure of 1-({4-[(4-(2-hydroxyethyl) ethylaminophenyl)diazenyl]-2,5-dimethoxyphenyl}diazenyl)-4-nitrobenzene (Compound 6) is:

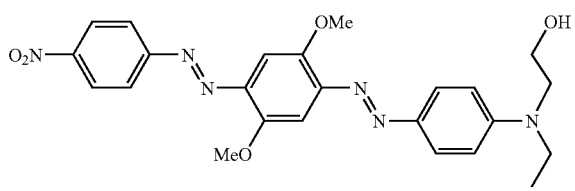

Compound 5 (0.4 g, 1.29 mmol) was sequentially treated dropwise with a $H_2PO_4/H_2SO_4$ mixture (30 ml of a 4:1 mixture) and sodium nitrite (0.1 g 1.55 mmol) while the temperature was maintained at about 0° C. The reagents were allowed to dissolve and the resulting solution was allowed to stir for about 20 minutes. The resulting diazonium mixture was then treated with urea (0.5 g), stirred for about 10 minutes, treated with hydrogen tetrafluoroborate (15 ml), and stirred for an additional 20 minutes to give the tetrafluoroborate diazonium salt. The resulting tetrafluoroborate diazonium salt was filtered and added to a solution of N,N-ethyl-2-hydroxyethylaniline in THF. The resulting violet mixture was neutralized with NaOAc (5.0 g), stirred for about 0.5 h, and concentrated to give a green solid. This solid was filtered and recrystallized from THF/Hexanes to give 0.37 g (59%) of Compound 6.

EXAMPLE 9

Preparation of 1-({4-[(4-(2-hydroxyethyl)ethylaminophenyl)diazenyl]-2-methylphenyl}diazenyl)-2,4-dinitrobenzene (Compound 26)

As described herein, the structure of 1-({4-[(4-(2-hydroxyethyl)ethylaminophenyl)diazenyl]-2-methylphenyl}diazenyl)-2,4-dinitrobenzene (Compound 26) is

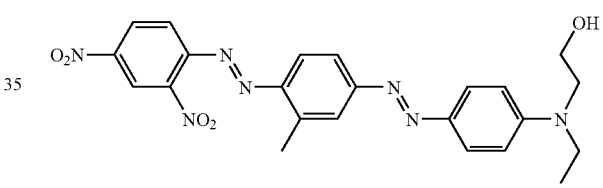

A diazonium salt was prepared by dissolving 2,4dinitroaniline in an acid mixture of $H_3PO_4/H_2SO_4$ and then treating the mixture with sodium nitrite while the temperature was maintained between 0–5° C. The diazonium salt was isolated as its tetrafluoroborate salt following the previous procedures. The diazonium salt (2.00 g, 7.0 mmol) was then added to a solution of m-toluidine (0.94 g, 8.80 mmol) in 20 mL THF. The resulting red mixture was stirred for 1 h and a solid precipitated. The solid was filtered and recrystallized from THF/Hexane to give 1.50 g (71%) of compound 12. Compound 12 was again diazotized and separated as its tetrafluoroborate salt following the previous procedure. A solution of N-ethyl-N—(B-hydroxyethyl)aniline(0.30 g, 1.80 mmol) in 30 mL of a THF/Acetone mixture(1:1), was treated with the diazonium salt(0.60 g, 1.53 mmol). The resultant purple solution was stirred for a further 1 hour then treated with water (20 mL). The precipitate was filtered and recrystallized from acetone-hexane to give the pure chromophore 26 (0.40 g, 45%). $^1$H NMR (DMSO) δ 8.9 (s, 1H), 8.6 (d, J=8.7 Hz, 1H), 8.0 (d, J=8.7 Hz, 1H), 7.8 (m, 3H), 7.7 (m, 2H), 6.9 (d, J=8.6 Hz, 2H), 3.6 (m, 2H), 3.5 (m, 4H), 3.3 (s, 1H), 2.8 (s, 3H), 2.5 (s, 3H), 1.2 (t, J=6.7 Hz, 3H). Compound 26 was incorporated into a polymer backbone following the literature procedure described in Saadeh et al., *Macromolecules* 30(18): 5403 (1997). A $^1$H NMR spectra was obtained.

All the references cited herein are hereby incorporated in their entireties by reference, as are, in particular, U.S. Ser. No. 09/357,201 and PCT/US00/19921.

While the present invention has been described in terms of specific embodiments, it is understood that variations and modifications will occur to those in the art, all of which are intended as aspects of the present invention. Accordingly, only such limitations as appear in the claims should be placed on the invention Although the applicant(s) invented the full scope of the claims, the claims are not intended to encompass within their scope the prior art work of others. Therefore, in the event that statutory prior art within the scope of a claim is brought to the attention of the applicant(s) by a Patent Office or other entity or individual, the applicant(s) reserve the right to exercise amendment rights under applicable patent laws to redefine the subject matter of such a claim to specifically exclude such statutory prior art or obvious variations of prior art from the scope of such a claim. Variations of the invention defined by such amended claims also are intended as aspects of the invention. Accordingly, this invention includes all modifications encompassed within the spirit and scope of the invention.

What is claimed is:

1. A compound of the formula:

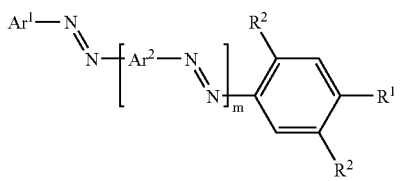

wherein $Ar^1$ is selected from the group consisting of:

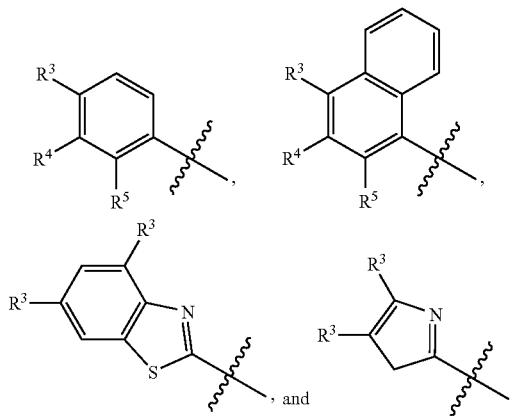

$Ar^2$ is selected from the group consisting of:

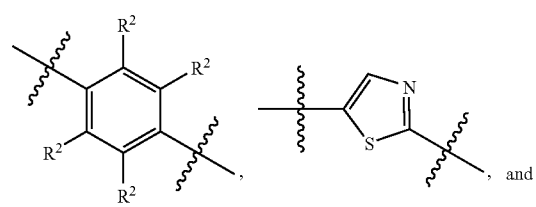

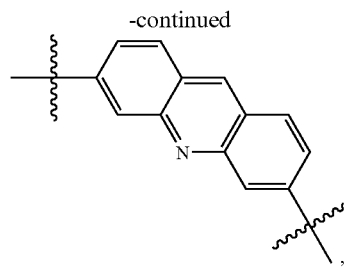

and if m=1; $R^1$ is an electron donating group selected from the group consisting of hydrogen, hydroxy, $C_{1-12}$alkoxy (optionally substituted with hydroxyl or amino), $C_{1-12}$dialkylamino (optionally substituted with hydroxyl or amino), and $C_{1-12}$alkylarylamino (optionally substituted with hydroxyl or amino), and diarylamino (optionally substituted with hydroxyl or amino); $R^2$ is hydrogen, $C_{1-12}$alkyl, carboxy, hydroxy, $C_{1-12}$alkoxy, or halo; and at least one of the groups $R^3$, $R^4$ and $R^5$ is $C_{1-12}$ mono- or polyhaloalkyl; while the other of the groups $R_3$, $R_4$ and $R_5$ are, independently, $C_{1-12}$alkyl, hydroxy, $_{1-12}$alkoxy, amino, $C_{1-12}$alkylarylamino (optionally substituted with hydroxyl or amino), diarylamino (optionally substituted with hydroxyl or amino), hydrogen, cyano, COR2, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted); and if m=2–9; $R^1$ is an electron donating group selected from the group consisting of hydrogen, hydroxy, amino, $C_{1-12}$alkoxy (optionally substituted with hydroxyl or amino), $C_{1-12}$dialkylamino (optionally substituted with hydroxyl or amino), $C_{1-12}$alkylarylamino (optionally substituted with hydroxyl or amino), and diarylamino (optionally substituted with hydroxyl or amino); $R^2$ is hydrogen, $C_{1-12}$alkyl, carboxy, hydroxy, $C_{1-12}$alkoxy, or halo; and at least one of the groups, $R^3$, $R^4$ and $R^5$ is an electron withdrawing group selected from the group consisting of hydrogen, cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), and arylsulfonyl (optionally substituted); while the other of the groups, $R^3$, $R^4$ and $R^5$ are, independently, $C_{1-12}$alkyl, hydroxy, $C_{1-12}$alkoxy, amino, $C_{1-12}$alkylarylamino (optionally substituted with hydroxyl or amino), diarylamino (optionally substituted with hydroxyl or amino), hydrogen, cyano, $COR^2$, $C_{1-12}$mono- or polyhaloalkyl, $C_{1-12}$alkenyl (substituted with an additional electron withdrawing group), halo, nitro, sulfonyl, $C_{1-12}$alkylsulfonyl (optionally substituted), or arylsulfonyl (optionally substituted).

2. A composition comprising an effective amount of the compound in accordance with claim 1 in admixture with a optically acceptable polymer.

3. A composition comprising an effective amount of the compound in accordance with claim 1 attached to a optically acceptable polymer with a C0–30 spacer.

* * * * *